UNITED STATES PATENT OFFICE.

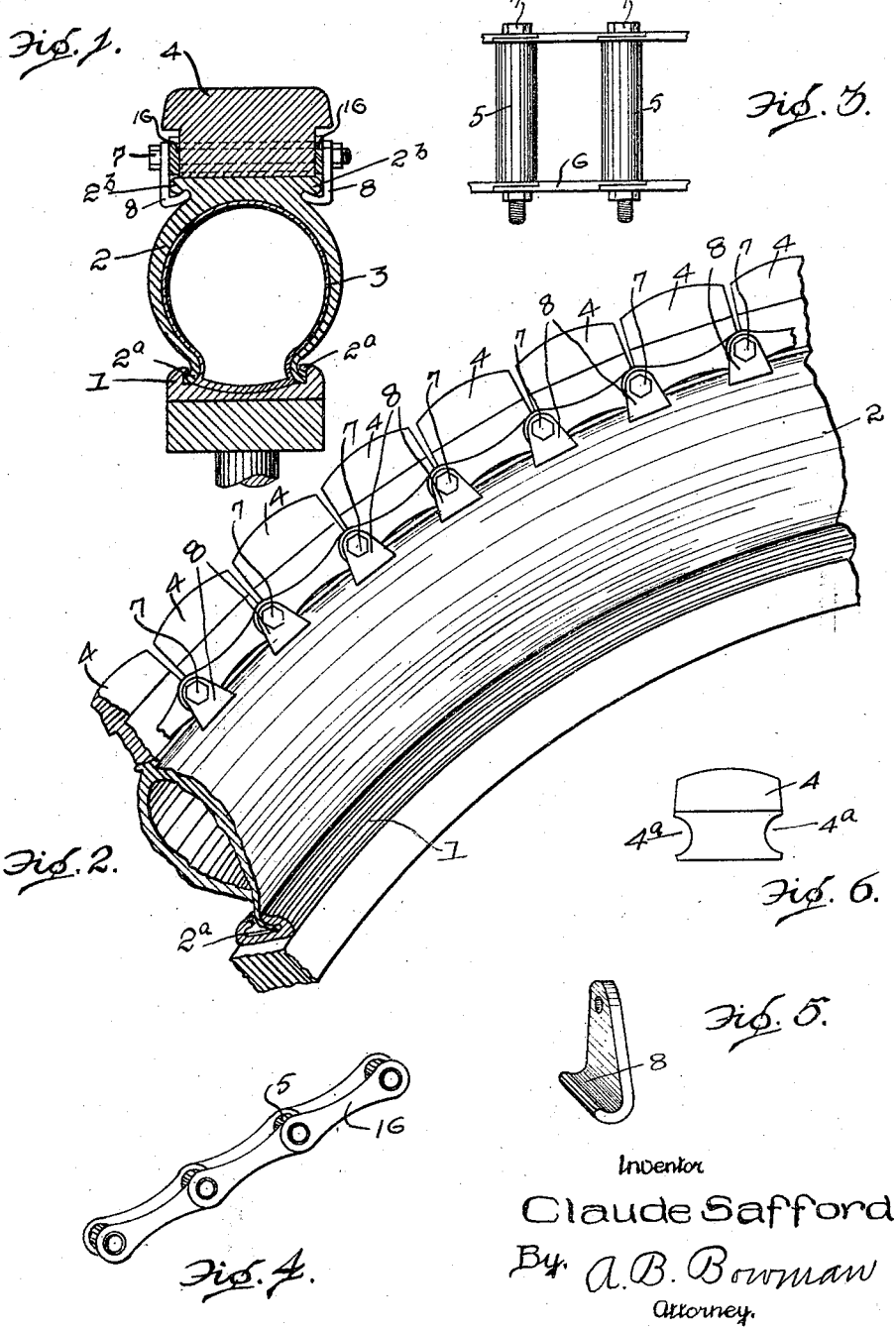

CLAUDE SAFFORD, OF SAN DIEGO, CALIFORNIA, ASSIGNOR OF ONE-FIFTH TO A. B. BOWMAN, OF SAN DIEGO, CALIFORNIA.

VEHICLE-TIRE.

1,286,793.      Specification of Letters Patent.      Patented Dec. 3, 1918.

Application filed September 11, 1916. Serial No. 119,380.

*To all whom it may concern:*

Be it known that I, CLAUDE SAFFORD, a citizen of the United States, residing at San Diego, in the county of San Diego and State of California, have invented certain new and useful Improvements in Vehicle-Tires, of which the following is a specification.

My invention relates to a vehicle tire to be used on vehicles of all kinds and classes, more particularly self-propelled vehicles, and the objects of my invention are: First, to provide a tire of this class which is very durable; second, to provide a tire of this class which will not puncture under ordinary circumstances; third, to provide a tire of this class the tread portion of which is sectional and may be readily replaced where chipped, broken or worn; fourth, to provide a tire of this class which is simple, and economical of construction, durable and easy to install; fifth, to provide a tire of this class which affords practically the same pliability as the ordinary pneumatic tire, and sixth, to provide a tire of this class which may be readily made applicable to the different and various rims of vehicles now in use belonging to the same class.

With these and other objects in view as will appear hereinafter my invention consists of certain novel features of construction, combination and arrangement of parts as will be hereinafter described in detail and particularly set forth in the appended claim, reference being had to the accompanying drawings and to the characters of reference thereon which form a part of this specification, in which:

Figure 1 is a sectional view of one side of my tire shown mounted on the rim. Fig. 2 is a perspective view of a fragmentary section of my tire mounted on the rim. Fig. 3 is a detailed plan view of a portion of the means for connecting the different sections to the pneumatic portion of the tire. Fig. 4 is a perspective view of the same. Fig. 5 is a perspective view of one of the clips for securing the connecting means to the pneumatic portion of the tire and Fig. 6 is a detailed side view of one of the tread sections.

Similar characters of reference refer to similar parts throughout the several views.

The rim 1, pneumatic casing 2, inner tube 3, tread sections 4, rollers 5, side links 6, bolts 7, and clips 8 constitute the principal parts of my tire.

The rim 1 as shown is the ordinary or conventional clencher rim and the casing 3 as shown is the ordinary or conventional type provided with beads $2^a$ around the inside surface for holding said casing in said rim when the tube 3 inside of said casing is inflated. It will be here noted, however, that the rim and connection portion of the casing 2 may be any of the various conventional types as desired. The casing 2 consists of layers of fabric and rubber the same as the ordinary or conventional casing and is shaped similarly thereto except that on the outer surface are provided a pair of beads $2^b$ extending around said casing and the outer surface of the tire is provided with a flat surface against which the inner surfaces of the tread sections 4 rest. These tread sections 4 are preferably of solid rubber although they may be made of various kinds of material. In some cases it might be desirable to make them of metal and non-resilient. These tread sections are shaped as shown and are each provided with oppositely disposed semi-circular recesses $4^a$ so that when said sections are placed adjacent each other on the outer surface of the casing 2 a round hole is provided adapted to fit snugly the rollers 5 so that these sections are held in position by means of said rollers 5 which rollers are connected together by means of said links 6 which are provided with holes adapted to accommodate the bolt 7. It will be here noted that these bolts 7 are considerably smaller than the inside diameter of the rollers so as to allow considerable play relatively to said bolts so that the tread sections 4 may be moved inwardly some distance before the bolts 7 are moved. Mounted on each end of the bolts on the outside of the links 6 are the clips 8 which extend over the beads $2^b$ for holding the sections 4 in certain relative position to the casing 2 and the side links 6 prevent expansion of the sections so that when the casing 2 is inflated, its outer surface presses tightly against the inner sections, thus holding them in position by the friction of the surfaces; however, if one or more of the sections contact with an object in the road, the sections will be pressed inwardly against the casing and the casing depressed at the point of contact and if the object is sufficiently large so that the play between the bolt 7 and the rollers 5 is taken up then the side links of the chain are depressed and carried along with said sections into the depressed portion of the casing 2.

Though I have shown and described a particular construction, combination and arrangement of parts I do not wish to be limited to this particular construction, combination and arrangement but desire to include in the purview of my invention the construction, combination and arrangement substantially as set forth in the appended claim.

It is obvious that with this construction there is provided a vehicle tire of the pneumatic type in which a plurality of changeable tread sections are placed on the outer surface of the pneumatic casing so that said tread sections may be depressed, depressing said casing at the contacting point, thus providing for practically the same resiliency as the ordinary pneumatic tire with added means for changing the tread portion or small portion thereof if chipped, broken, worn or otherwise defective, that the side links 6, bolts 7, rollers 5 and clips 8 hold said sections in position on the outer surface of the pneumatic casing but allow for their ready depression upon contact with objects in the roadway, that the connection between the rim 1 and the casing 2 may be the clencher, straight-side or any of the numerous types now in use, thus making it applicable to the various types of vehicle wheels now in use.

Having thus described my invention what I claim as new and desire to secure by Letters Patent, is:

In a vehicle tire, the combination of a pneumatic tire member provided with beads on its outer surface, a plurality of tread sections adapted to fit against each other and against the outer surface of said pneumatic tire member and means for readily securing said tread sections to said pneumatic tire member and for readily removing the same therefrom, comprising a chain engaging said tread sections and clips connecting said chain with the beads on said pneumatic tire member.

In testimony whereof, I have hereunto set my hand at San Diego, California, this 5th day of September 1916.

CLAUDE SAFFORD.

Copies of this patent may be obtained for five cents each, by addressing the "Commissioner of Patents, Washington, D. C."